United States Patent
Kim et al.

(10) Patent No.: US 8,400,479 B2
(45) Date of Patent: Mar. 19, 2013

(54) COLOR SIGNAL DISPLAY APPARATUS AND METHOD

(75) Inventors: Il-do Kim, Seoul (KR); Moon-cheol Kim, Suwon-si (KR); Dong-bum Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1888 days.

(21) Appl. No.: 11/151,432

(22) Filed: Jun. 14, 2005

(65) Prior Publication Data

US 2005/0280850 A1    Dec. 22, 2005

(30) Foreign Application Priority Data

Jun. 16, 2004  (KR) .................. 10-2004-0044556

(51) Int. Cl.
*G09G 5/10*    (2006.01)
(52) U.S. Cl. .......... 345/690; 348/744; 348/602
(58) Field of Classification Search ......... 345/690; 348/744, 602
See application file for complete search history.

(56) References Cited

U.S. PATENT DOCUMENTS

| | | | |
|---|---|---|---|
| 5,384,912 A | 1/1995 | Ogrinc et al. | |
| 5,754,184 A | 5/1998 | Ring et al. | |
| 6,388,648 B1 | 5/2002 | Clifton et al. | |
| 6,753,931 B2 * | 6/2004 | Kane et al. | 348/742 |
| 6,803,921 B1 | 10/2004 | Balasubramanian et al. | |
| 6,882,445 B1 | 4/2005 | Takahashi et al. | |
| 6,995,738 B2 | 2/2006 | Florence | |
| 7,131,762 B2 | 11/2006 | Richards et al. | |
| 7,199,839 B2 * | 4/2007 | Kim | 348/675 |
| 7,210,794 B2 | 5/2007 | Tangen | |
| 7,283,181 B2 * | 10/2007 | Allen et al. | 348/744 |
| 2002/0060662 A1 | 5/2002 | Hong | |
| 2002/0135597 A1 | 9/2002 | Kagawa et al. | |
| 2002/0159081 A1 | 10/2002 | Zeng | |
| 2003/0016198 A1 | 1/2003 | Nagai et al. | |
| 2003/0048815 A1 | 3/2003 | Cook | |
| 2003/0086022 A1 | 5/2003 | White | |
| 2003/0179192 A1 * | 9/2003 | Allen et al. | 345/207 |

(Continued)

FOREIGN PATENT DOCUMENTS

CN    1479915       3/2004
CN    1627356 A     6/2005

(Continued)

OTHER PUBLICATIONS

Hungarian Search Report dated Nov. 29, 2006 issued in Hungarian Patent Application No. P0500602.

(Continued)

*Primary Examiner* — William Boddie
*Assistant Examiner* — Leonid Shapiro
(74) *Attorney, Agent, or Firm* — Sughrue Mion, PLLC

(57) ABSTRACT

A color signal processing apparatus calculates a target color gamut including color signal values of each pixel of an input video, and calculates target primary colors corresponding to the calculated target color gamut. The color signal processing apparatus produces the calculated target primary colors by mixing primary colors in an input color gamut of the input video, and converts and outputs the color signal values of each pixel of the input video to match the calculated target color gamut defined by the calculated target primary colors. Since it is possible to adaptively transform the input color gamut of the input video, the input video that is reproduced has an increased light quantity and an enhanced contrast.

12 Claims, 6 Drawing Sheets

U.S. PATENT DOCUMENTS

| | | |
|---|---|---|
| 2003/0184559 A1 | 10/2003 | Jiang et al. |
| 2003/0214259 A9 | 11/2003 | Dowling et al. |
| 2003/0227577 A1 | 12/2003 | Allen et al. |
| 2004/0021672 A1 | 2/2004 | Wada |
| 2004/0086176 A1 | 5/2004 | Meier et al. |
| 2004/0170319 A1 | 9/2004 | Maurer |
| 2004/0212783 A1 | 10/2004 | Wada |
| 2004/0212895 A1 | 10/2004 | Pate |
| 2005/0007390 A1 | 1/2005 | Yoshida et al. |
| 2005/0122368 A1 | 6/2005 | Yamazaki et al. |
| 2005/0128497 A1 | 6/2005 | Hirashima et al. |
| 2006/0105485 A1 | 5/2006 | Basin et al. |
| 2006/0262224 A1 | 11/2006 | Ha et al. |
| 2006/0285136 A1 | 12/2006 | Shin et al. |
| 2008/0260271 A1 | 10/2008 | Lundstrom et al. |
| 2009/0121992 A1 | 5/2009 | Asao et al. |

FOREIGN PATENT DOCUMENTS

| | | |
|---|---|---|
| EP | 0 597 797 A1 | 5/1994 |
| EP | 0-613-309 A2 | 8/1994 |
| EP | 0 967 790 A2 | 12/1999 |
| EP | 1 102 478 A2 | 5/2001 |
| EP | 1205902 | 5/2002 |
| EP | 1422665 A1 | 5/2004 |
| JP | 05-260498 A | 10/1993 |
| JP | 07-274089 A | 10/1995 |
| JP | 09-322187 A | 12/1997 |
| JP | 10-319911 A | 12/1998 |
| JP | 11-17968 | 1/1999 |
| JP | 2001-188513 | 7/2001 |
| JP | 2001-290458 A | 10/2001 |
| JP | 2002-27263 | 1/2002 |
| JP | 2002-41016 | 2/2002 |
| JP | 2002-118764 | 4/2002 |
| JP | 2002-140038 | 5/2002 |
| JP | EP 1 205 902 A2 * | 5/2002 |
| JP | 2003-345309 A | 12/2003 |
| KR | 92-14359 U | 7/1992 |
| KR | 1998-072902 A | 11/1998 |

OTHER PUBLICATIONS

Dutch Search Report dated Feb. 13, 2008 issued in NL1029261.
Chinese Office Action mailed Aug. 1, 2008 in CN200510077981.0.
Japanese Office Action dated Jul. 31, 2007 issued in JP 2005-176846.
Communication dated Apr. 12, 2011, issued by the Japanese Patent Office in Japanese Application No. 2006-123964.
Communication dated May 3, 2011, issued by the Korean Intellectual Property Office in Korean Application No. 10-2005-0053494, English-language translation.
Communication dated Mar. 30, 2010 from the Japanese Application No. 2006-123964.
"Fargrymder och arbestrymder" Feb. 9, 2005—Retrieved from the internet.
Non-Final Office Action dated May 22, 2009 issued in U.S. Appl. No. 11/373,442.
Non-Final Office Action dated Nov. 27, 2009 issued in U.S. Appl. No. 11/373,442.
Final Office Action dated Jun. 8, 2010 issued in U.S. Appl. No. 11/373,442.
Non-Final Office Action dated Feb. 18, 2011 issued in U.S. Appl. No. 11/373,442.
Non-Final Office Action dated Aug. 16, 2011 issued in U.S. Appl. No. 11/373,442.
Final Office Action dated Jan. 20, 2012 issued in U.S. Appl. No. 11/373,442.

* cited by examiner

COLOR SIGNAL DISPLAY APPARATUS AND METHOD

CROSS-REFERENCE TO RELATED APPLICATIONS

This application claims the benefit under 35 U.S.C. §119(a) from Korean Patent Application No. 2004-44556, filed on Jun. 16, 2004 in the Korean Intellectual Property Office, the disclosure of which is incorporated herein by reference in its entirety.

BACKGROUND OF THE INVENTION

1. Field of the Invention

The present general inventive concept relates to a color signal processing apparatus and method. More specifically, the present general inventive concept relates to a color signal processing apparatus and method capable of adaptively transforming a color gamut of a video being reproduced depending on an input video.

2. Description of the Related Art

Typically, a reproducing device, such as a monitor or a scanner, utilizes a color space or a color model that is suited for its own purpose. For example, a color video printing device works in a CMY color space, and a color cathode ray tube (CRT) monitor or a computer graphic device works in an RGB color space. A device processing hue, saturation and intensity works in an HSI color space. In addition, a CIE color space, in which any device can work with high accuracy, can be used to define device-independent colors. The CIE color space includes are CIE-XYZ, CIE L*a*b, and CIE L*u*v color spaces.

A color reproducing device may use various colors according to the color space being worked in. The color reproducing device typically uses three primary colors. In particular, the RGB color space, in which the color CRT monitor and the color graphic device work, uses three primary colors including red, green, and blue. The CMY color space, in which the color video printing device works, uses three secondary colors including cyan, magenta, and yellow.

The color reproducing device may employ a specific color gamut as well as the color space. While the color space defines colors (i.e., a relationship between colors) the color gamut represents a range of possible colors that can be reproduced by mixing the colors. Accordingly, the color gamut, which is the color range that is reproducible by a color reproducing device, depends on the primary colors used by the color reproducing device. FIG. 1 is a diagram illustrating a color gamut reproducible by a conventional color reproducing device. As illustrated in FIG. 1, inside of a triangle GAMUT1, which is formed by lines between primary colors P1, P2, and P3 used by the conventional color reproducing device in a CIE-XYZ color space, represents the color range that is reproducible by the conventional color reproducing device. If the conventional color reproducing device uses the primary colors P1, P2, and P3, the inside of the triangle GAMUT1 indicates the corresponding color range or the color gamut. If the conventional color reproducing device uses the primary colors P1', P2', and P3', the inside of a triangle GAMUT2 indicates the corresponding color range.

However, when reproducing an input video that complies with a general broadcast standard or a color signal standard, the conventional color reproducing device uses its own specified primary colors. Accordingly, the video is reproduced having a limited brightness and a limited contrast even when a distribution of colors of the input video is limited to a part of the entire color gamut.

SUMMARY OF THE INVENTION

The present general inventive concept provides a color signal processing apparatus and a method of adaptively adjusting a reproducible color gamut according to an input video.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a color signal processing apparatus comprising a target primary color calculator to calculate a target color gamut including color signal values of each pixel of an input video and to calculate target primary colors corresponding to the calculated target color gamut, a primary color reconstructor to produce the calculated target primary colors by mixing primary colors of an input color gamut of the input video, and a video data converter to convert and output color signal values of each pixel of the input video to match the calculated target color gamut defined by the calculated target primary colors.

The color signal processing apparatus may further comprise a color coordinates converter to convert color coordinates of each pixel of the input video to color coordinate values in a CIE-XYZ color space, which is a device-independent color space, and to provide the converted color coordinates of each pixel of the input video to the target primary color calculator as the color signal values.

The input video may be received in an RGB color space. The target primary color calculator may determine first lines between the primary colors in the input color gamut of the input video in a CIE-xy color space of the CIE-XYZ color space and calculates the target primary colors by determining a boundary defined by second lines having the same slopes as the determined first lines and the boundary including all of the color signal values of the pixels of the input video. The primary color reconstructor produces the target primary colors based on a mixing ratio of the input video. The mixing ratio may be obtained based on a colorimetric display model using the converted color coordinates of the target primary colors and white tristimulus values.

A color reproducing apparatus may change and reproduce color signal values of an input video using the color signal processing apparatus.

The foregoing and/or other aspects and advantages of the present general inventive concept may also be achieved by providing a method of processing a color signal including calculating a target color gamut including all color signal values of each pixel of an input video and calculating target primary colors corresponding to the calculated target color gamut, producing the calculated target primary colors by mixing primary colors in an input color gamut of the input video, and converting and outputting the color signal values of each pixel of the input video to match the calculated target color gamut determined by the calculated target primary colors.

The calculating of the target color gamut may comprise converting color coordinates of each pixel of the input video to color coordinates values in a CIE-XYZ color space, which is a device-independent color space, and calculating the target color gamut to include all of the converted color coordinates of the input video.

The input video may be received in a RGB color space. The producing of the calculated target primary colors may comprise determining lines between the primary colors in the input color gamut of the input video in a CIE-xy color space of the CIE-XYZ color space, determining the color coordinates of pixels of the input video that are closest to the determined first lines, and calculating the target primary colors using an intersection point of second lines having the same slopes as the determined first lines and passing through the color coordinates that are determined to be closest to the determined first lines. The outputting of the color signal values of each pixel of the input video produces the target primary colors according to a mixing ratio of the input video based on a calorimetric display model using a color coordinates of the target primary colors and white tristimulus values.

The foregoing and/or other aspects and advantages of the present general inventive concept may also be achieved by providing a computer readable medium containing an executable code to process a color signal. The medium comprises a first executable code to calculate a target color gamut including all color signal values of each pixel of an input video and to calculate target primary colors corresponding to the calculated target color gamut, a second executable code to produce the calculated target primary colors by mixing primary colors in an input color gamut of the input video, and a third executable code to convert and output the color signal values of each pixel of the input video to match the calculated target color gamut defined by the calculated target primary colors.

The medium may further comprise a fourth executable code to convert color coordinates of each pixel of the input video to color coordinates values in a CIE-XYZ color space, which is a device-independent color space, and to provide the converted color coordinates of each pixel of the input video to the first executable code.

BRIEF DESCRIPTION OF THE DRAWINGS

These and/or other aspects and advantages of the general inventive concept will become apparent and more readily appreciated from the following description of the embodiments, taken in conjunction with the accompanying drawing figures of which.

DETAILED DESCRIPTION OF THE PREFERRED EMBODIMENTS

Figure 1:
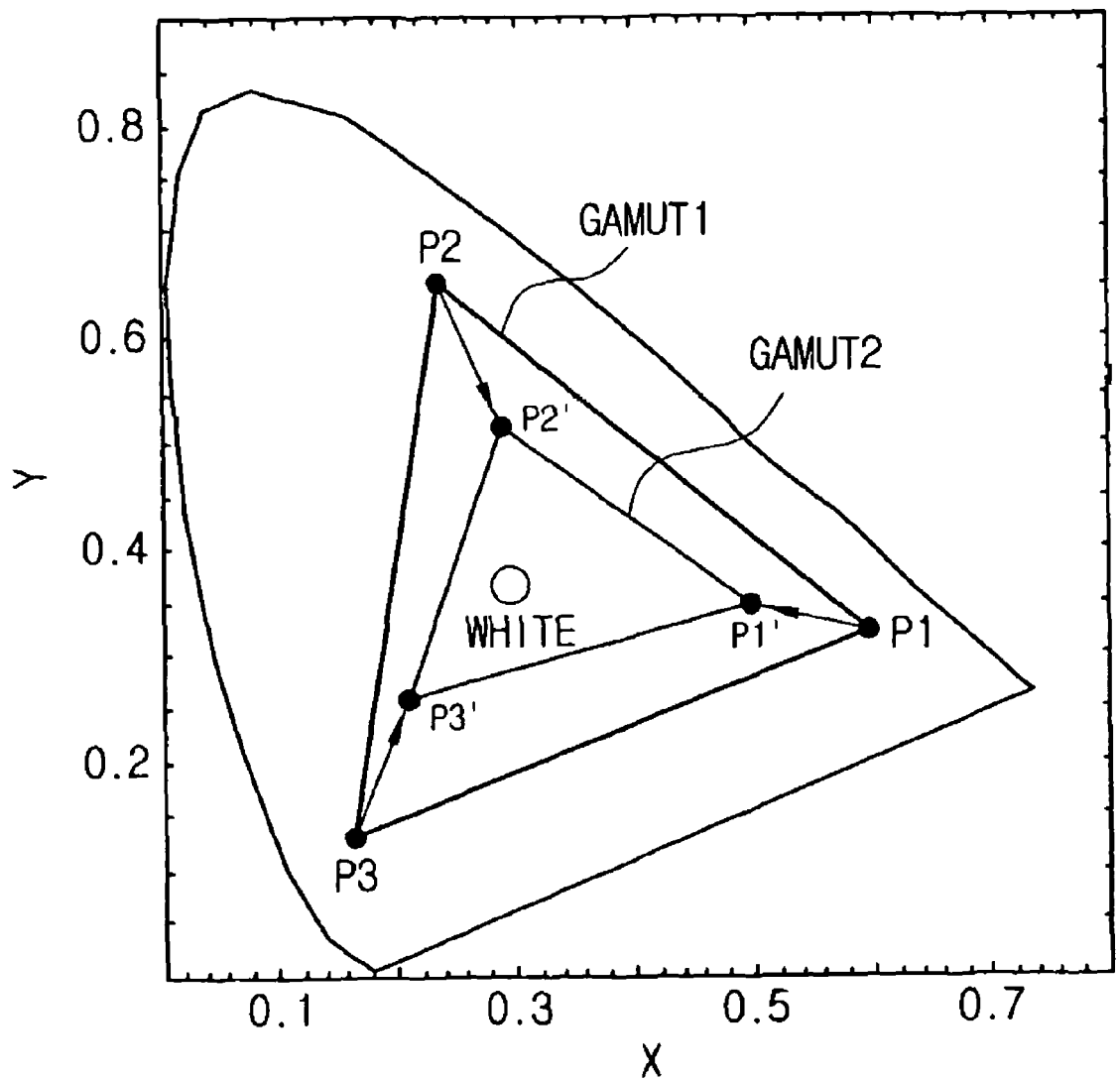
FIG. 1 is a diagram illustrating a color gamut reproducible by a conventional color reproducing device.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the drawings.

Figure 2:
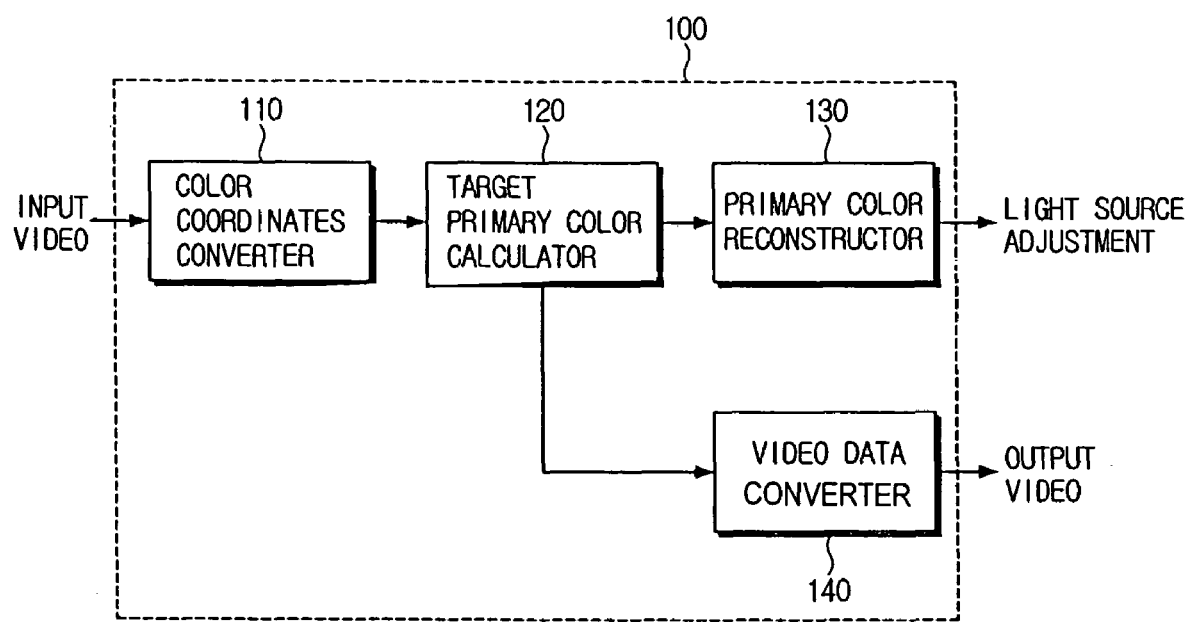
FIG. 2 is a block diagram illustrating a color signal processing apparatus according an embodiment of the present general inventive concept.

FIG. 2 is a block diagram illustrating a color signal processing apparatus according to an embodiment of the present general inventive concept. Referring to FIG. 2, the color signal processing apparatus 100 includes a color coordinates converter 110, a target primary color calculator 120, a primary color reconstructor 130, and a video data converter 140.

The color coordinates converter 110 converts color coordinates relating to each pixel of an input video to color coordinates to a device-independent color space (e.g., a CIE-XYZ color space). The input video may comply with a broadcast standard, such as National Television System Committee (NTSC), Phase Alternation by Line system (PAL), and SMPTE-C, or a color signal standard, such as sRGB of International Electro-Technical Commission (IEC). If the input video is standard non-linear color signals, the color coordinates converter 110 corrects the non-linear color signals to standard linear color signals, and then converts the standard linear color signals to color coordinates in the device-independent color space (e.g., the CIE-XYZ color space). Other device independent color spaces may also be used with the present general inventive concept.

The target primary color calculator 120 calculates target primary colors to include all color signal values of the respective pixels of the input video converted by the color coordinates converter 110.

The primary color reconstructor 130 generates the target primary colors calculated by the target primary color calculator 120 by mixing primary colors that define an input color gamut of a color space specified by the broadcast standard or the color signal standard of the input video.

The video data converter 140 converts the color signal values of the respective pixels of the input video based on the target primary colors calculated by the target primary color calculator 120.

Figure 3:
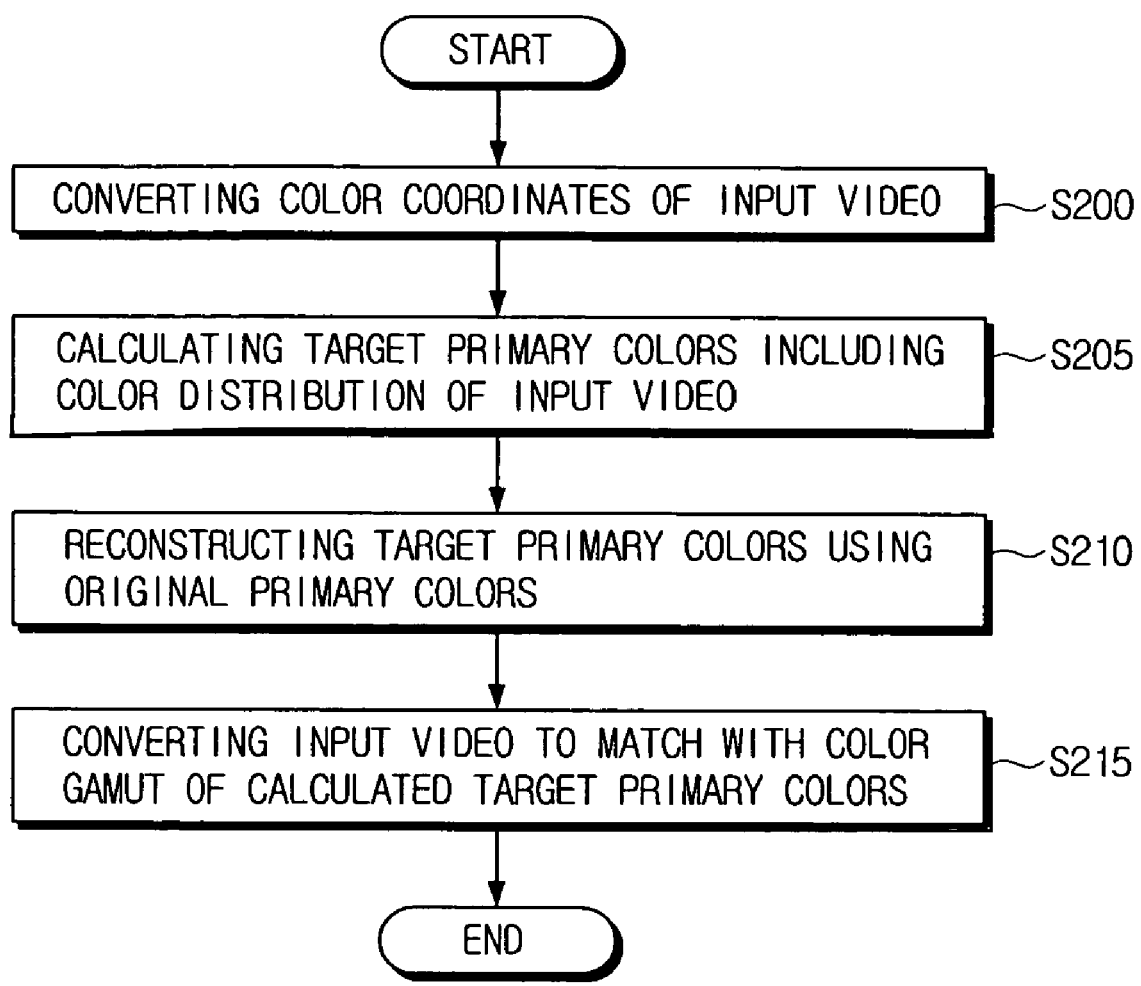
FIG. 3 is a flowchart illustrating a method of processing a color signal according to an embodiment of the present general inventive concept.

FIG. 3 is a flowchart illustrating a method of processing a color signal according to an embodiment of the present general inventive concept. In some embodiments of the present general inventive concept, the method of FIG. 3 may be performed by the color signal processing apparatus illustrated in FIG. 2. Thus, the method of FIG. 3 will be described with reference to FIG. 2. Referring to FIGS. 2 and 3, the color coordinates converter 110 converts the color coordinates (i.e., of the color signal values) of the respective pixels of the input video to the color coordinates in the device-independent color space (operation S220). The device independent color space may be a CIE-XYZ color space. The input video may comply with a broadcast standard or a color signal standard and may have a corresponding input color gamut of a color space, as mentioned above. The following description describes a case in which the input video complies with an sRGB color signal standard (i.e., the color gamut is defined by red, green, and blue).

Figure 4:
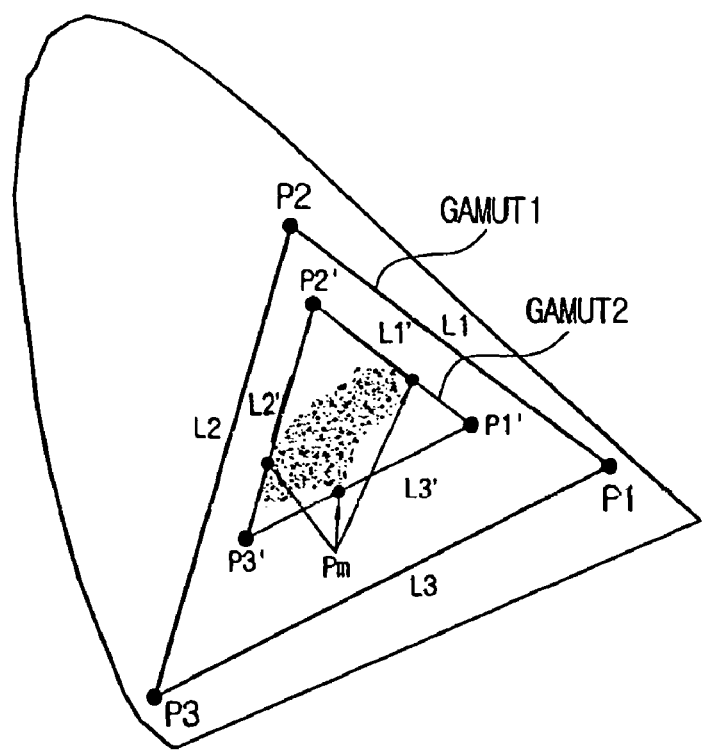
FIG. 4 is a diagram illustrating an operation of calculating target primary colors according to an embodiment of the present general inventive concept.

The target primary color calculator 120 calculates the target primary colors to include a color distribution of the input video converted by the color coordinates converter 110, that is, all of the color signal values of the input video (operation S205). Alternatively, in some embodiments, the target primary color calculator 120 may calculate the target primary colors to include substantially all of the color signal values of the input video. FIG. 4 is a diagram illustrating the operation S205 of calculating the target primary colors. Primary colors of the input video (i.e., that define the input color gamut) are represented by P1, P2, and P3 in a CIE-xy color space as illustrated in FIG. 4. The input color gamut of the input video is represented by an inside of a triangle GAMUT1 having three points P1, P2, and P3 that correspond to the primary colors. The CIE-xy color space and the CIE-XYZ color space are related to each other by x=X/(X+Y+Z) and y=Y/(X+Y+Z). If the color coordinates, which correspond to the color signal values of the respective pixels of the input video converted by the color coordinates converter 110, are distributed as indicated by dots located in the triangle GAMUT2 of FIG. 4, the target primary colors are P1', P2', and P3', which include all of the color signal values of the respective pixels of the input video. In other words, the target primary colors P1', P2', and P3' are selected such that all of the color signal values of the respective pixels of the input video can be represented by combining the target primary colors P1', P2', and P3' in the target color gamut (i.e., GAMUT2). Thus, an unused portion of the input color gamut, represented by a difference between the triangles GAMUT1 and GAMUT2, is removed by converting the input color gamut to the target color gamut. Accordingly, a remaining luminance that would be used to create colors in a color range of the input color gamut can be used instead to increase a brightness of colors in a smaller color range of the target color gamut. As described below, the input color gamut can be transformed to the target color gamut by using spokes in a color wheel or by operating different color sources during a color period of a predetermined color.

The target primary colors P1', P2', and P3' may be obtained through various methods. Referring again to FIG. 4, there are first three lines L1, L2, and L3 that connect the primary colors P1, P2, and P3 that define the input color gamut of the input video. The target primary color calculator 120 determines three pixel coordinates Pm that are located closest to each of the first three lines L1, L2, and L3, respectively. Second three lines L1', L2', and L3' that pass through corresponding ones of the three pixel coordinates Pm have the same slopes as the corresponding first lines L1, L2, and L3. The second three lines that pass through each Pm intersect at each of the target primary colors P1', P2', and P3'.

Referring back to FIG. 3, once the target primary color calculator 120 calculates the target primary colors, the primary color reconstructor 130 reconstructs the target primary colors using original primary colors of the input color gamut (GAMUT1 in FIG. 4) (operation S210). The reconstruction of the target primary colors (P1', P2', and P3' in FIG. 4) is described in detail below.

In the following description Ps is assumed to represent a color coordinates matrix of the input video primary colors including P1($x_{rr}$, $y_{rr}$, $z_{rr}$), P2($x_{gg}$, $y_{gg}$, $z_{gg}$), and P3($x_{bb}$, $y_{bb}$, $z_{bb}$) that define the input color gamut GAMUT1 in FIG. 4, and that white tristimulus values include Fws=($X_{WS}$, $Y_{WS}$, $Z_{WS}$). Additionally, Pt is assumed to represent a color coordinates matrix of the target primary colors P1'($x_{rt}$, $y_{rt}$, $z_{rt}$), P2'($x_{gt}$, $y_{gt}$, $z_{gt}$), and P3'($x_{bt}$, $y_{bt}$, $z_{bt}$) that define the target color gamut GAMUT2 in FIG. 4 obtained from the calculation of the target primary colors, and that a target white is Fwt=($X_{wt}$, $Y_{wt}$, $Z_{wt}$). A colorimetric display model is obtained in accordance with the following equation:

$$Fs^T = Ms \cdot (R, G, B)^T = Ps \cdot Ns \cdot (R, G, B)^T \quad \text{[Equation 1]}$$

where $$Ps = \begin{pmatrix} x_{rr} & x_{gg} & x_{bb} \\ y_{rr} & y_{gg} & y_{bb} \\ z_{rr} & z_{gg} & z_{bb} \end{pmatrix}, Ns = \begin{pmatrix} N_r & 0 & 0 \\ 0 & N_g & 0 \\ 0 & 0 & N_b \end{pmatrix},$$

$$Ms = \begin{pmatrix} X_{rr} & X_{gg} & X_{bb} \\ Y_{rr} & Y_{gg} & Y_{bb} \\ Z_{rr} & Z_{gg} & Z_{bb} \end{pmatrix}.$$

In Equation 1, a normalized matrix Ns is set to Fs=Fws when R=G=B=1, that is, when white is a maximum. A red primary vector Frs=($x_{rr}$, $y_{rr}$, $z_{rr}$) becomes a tristimulus value of R reproduced when (R, G, B)=(1, 0, 0). In the same manner, a green primary vector Fgs=($x_{gg}$, $y_{gg}$, $z_{gg}$) becomes a tristimulus value of G reproduced when (R, G, B)=(0, 1, 0), and a blue primary vector Fbs=($x_{bb}$, $y_{bb}$, $z_{bb}$) becomes a tristimulus value of B reproduced when (R, G, B)=(0, 0, 1). Accordingly, the input color gamut $F_s$ defined by the original primary colors (P1, P2, and P3) of the input video is defined in Equation 1.

A display model of the target primary colors is defined in accordance with the following equation:

$$Ft^T = Mt \cdot (R, G, B)^T = Pt \cdot Nt \cdot (R, G, B)^T \quad \text{[Equation 2]}$$

where $$Pt = \begin{pmatrix} x_{rt} & x_{gt} & x_{bt} \\ y_{rt} & y_{gt} & y_{bt} \\ z_{rt} & z_{gt} & z_{bt} \end{pmatrix}, Nt = \begin{pmatrix} N_{rt} & 0 & 0 \\ 0 & N_{gt} & 0 \\ 0 & 0 & N_{bt} \end{pmatrix},$$

$$Mt = \begin{pmatrix} X_{rt} & X_{gt} & X_{bt} \\ Y_{rt} & Y_{gt} & Y_{bt} \\ Z_{rt} & Z_{gt} & Z_{bt} \end{pmatrix}.$$

A normalized matrix Nt may be obtained from the given target white in Equation 2. A target red primary vector is Frt=($x_{rt}$, $y_{rt}$, $z_{rt}$), a target green primary vector is Fgt=($x_{gt}$, $y_{gt}$, $z_{gt}$), and a target blue primary vector Fbt=($x_{bt}$, $y_{bt}$, $z_{bt}$).

The following equation defines target primary vectors (Frt, Fgt, Fbt) from the original primary vectors (Frs, Fgs, Fbs) in accordance with Equations 1 and 2:

$$F_{rt} = k_{rr} \cdot F_{rs} + k_{gr} \cdot F_{gs} + k_{br} \cdot F_{bs}$$

$$F_{gt} = k_{rg} \cdot F_{rs} + k_{gg} \cdot F_{gs} + k_{bg} \cdot F_{bs}$$

$$F_{bt} = k_{rb} \cdot F_{rs} + k_{gb} \cdot F_{gs} + k_{bb} \cdot F_{bs}. \quad \text{[Equation 3]}$$

Equation 3 can be rearranged as follows:

$$(F_{rt} \ F_{gt} \ F_{bt}) = (F_{rs} \ F_{gs} \ F_{bs}) \cdot \begin{pmatrix} k_{rr} & k_{rg} & k_{rb} \\ k_{gr} & k_{gg} & k_{gb} \\ k_{br} & k_{bg} & k_{bb} \end{pmatrix} \quad \text{[Equation 4]}$$

$$= (F_{rs} \ F_{gs} \ F_{bs}) \cdot G$$

where $$G = \begin{pmatrix} k_{rr} & k_{rg} & k_{rb} \\ k_{gr} & k_{gg} & k_{gb} \\ k_{br} & k_{bg} & k_{bb} \end{pmatrix}.$$

The matrix G that produces the target primary colors from Equation 4 is a mixing ratio of the original primary colors (P1, P2, and P3) that define the input color gamut. A major signal, that is, the diagonal component ($k_{rr}$, $k_{gg}$, $k_{bb}$) in the matrix G may be smaller than the maximum value '1' in some cases. Hence, to maximize a luminance of the target color gamut $F_t$ defined by the target primary colors (P1', P2', and P3'), the matrix G is divided by N=Max($k_{rr}$, $k_{gg}$, $k_{bb}$) and standardized in accordance with the following equation:

$$Gn = G/N. \quad \text{[Equation 5]}$$

Accordingly, a display device can produce the target primary colors using the original primary colors by adjusting a quantity of a light source of each channel using values of the Gn matrix obtained from Equation 5. In particular, the primary color reconstructor 130 can adjust the quantity of the light source according to the Gn matrix. As illustrated in FIG. 3, the video data converter 140 converts and outputs the respective pixels of the input video such that the input color gamut of the input video defined by the original primary colors is mapped into the target color gamut defined by the calculated target primary colors (operation 215) in accordance with the following equation:

$$\begin{pmatrix} R' \\ G' \\ B' \end{pmatrix} = Mt^{-1} \cdot Ms \begin{pmatrix} R \\ G \\ B \end{pmatrix}. \quad \text{[Equation 6]}$$

As explained above, the color signal processing apparatus according to various embodiments of the present general inventive concept adaptively transforms the color gamut of the input video that is reproduced according to the color distribution of the input video. That is, the present general inventive concept re-defines a color gamut according to the color distribution of the input video, since the entire input color gamut may not be required to represent the color signals of the input video. Accordingly, the display device can enhance the brightness and the contrast of the input video that is reproduced by utilizing a remaining light quantity. This operation is described in detail below.

Figure 5:
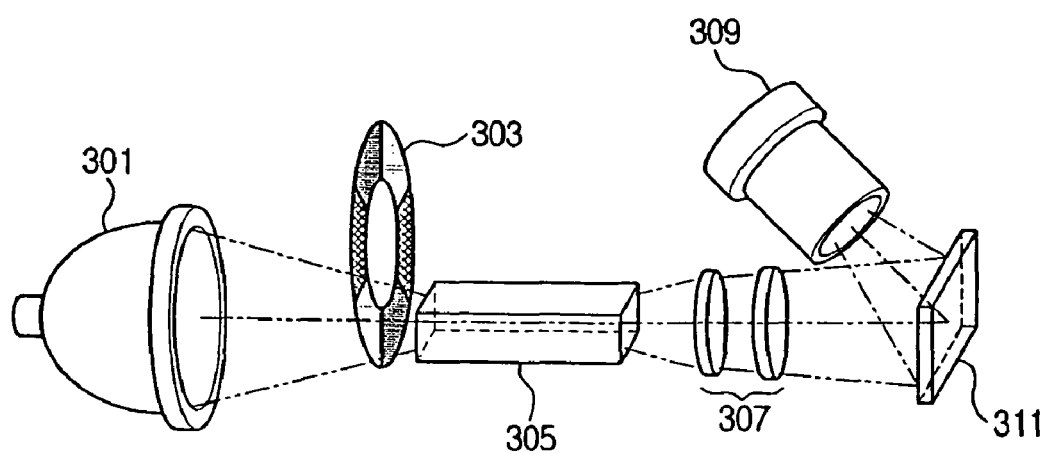
FIG. 5 is a view illustrating a structure of a display device that uses a color wheel.

FIG. 5 illustrates a three channel (e.g., RGB) digital light processing (DLP) projection display device that uses a color wheel. The DLP projection display device includes a lamp 301, a color wheel 303, a light pipe 305, an illumination optics 307, a projection optics 309, and a digital mirror device (DMD) 311.

A spectrum of light produced by the lamp 301 is separated into three primary colors (e.g., RGB) by the color wheel 303. When the separated colors are emitted to the DMD 311 through the light pipe 305 and the illumination optics 307 in a sequence, the colors are synchronized with a video signal that is applied to each pixel of the DMD 311. Accordingly, the colors are projected on a screen through the projection optics 307 according to the video signal applied to the DMD 311.

Figure 6:
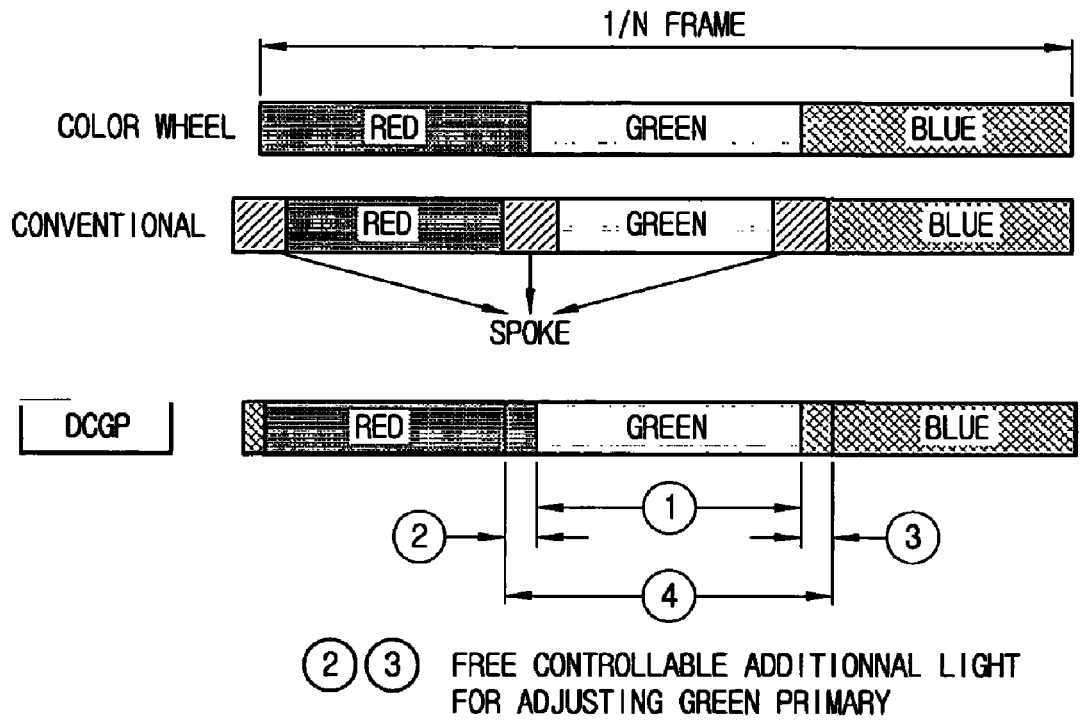
FIG. 6 illustrates an operation of the display device of FIG. 5 according to an embodiment of the present general inventive concept.

FIG. 6 illustrates a method of processing color in the DLP projection display device of FIG. 5 according to an embodiment of the present general inventive concept. Referring to FIGS. 5 and 6, the color wheel 303 can rotate n times per video frame. For example, an RGB color period may be approximately 1/n*16 ms. Alternatively, other types of color wheels and/or color periods may alternatively be used with the present general inventive concept. A conventional method indicated as "CONVENTIONAL" in FIG. 6 does not use spokes of the color wheel 303 (i.e., boundaries between different color segments), because beam spots, which are not points, pass through the color wheel 303 and cause a mixture of two adjacent colors at the boundaries of the different color segments of the color wheel 303. The color mixture degrades purity of the primary colors of the color wheel 303. As a result, a reduction of the light quantity is inevitable when the spokes of the color wheel 303 are not used as in the conventional method illustrated in FIG. 6.

On the other hand, the method of processing color in the DLP projection display device of FIG. 5 according to an embodiment of the present general inventive concept is indicated by "DCGP" in FIG. 6. The method of processing color according to the present general inventive concept utilizes the spokes of the color wheel 303 as opposed to the conventional method. Referring back to FIG. 4, assume that GAMUT1 is the input color gamut defined by the primary colors (P1, P2, and P3) of the input video (i.e., the original primary colors) and that GAMUT2 is the target color gamut defined by the target primary colors (P1', P2', and P3'). Regarding a green primary color (P2) in FIG. 6, a color produced by section 1 corresponds to P2 and the color produced by section 4 corresponds to the target primary color P2'. Two other mixed components P1 with P2 and P2 with P3 correspond to sections 2 and 3, respectively. In other words, sections 2 and 3 correspond to values of the green color of the matrix Gn in Equation 5. In particular, the length of section 1 is $k_{gg}$, the length of section 2 is $k_{rg}$, and the length of section 3 is $k_{bg}$. Thus, the target primary color P2' can be expressed by the matrix Gn as a combination of the spokes (i.e., the sections 2 and 3 of FIG. 6) and the green color segment (i.e., the section 1 of FIG. 6). Accordingly, it is possible to increase the light quantity by using the spokes of the color wheel 303 to re-define a color gamut according to the color distribution of the input video.

Figure 7:
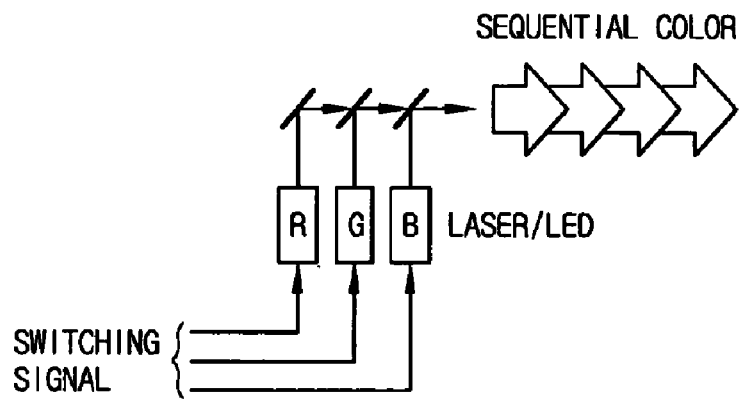
FIG. 7 illustrates a structure of a display device that uses a separable and controllable light source.
Figure 8:
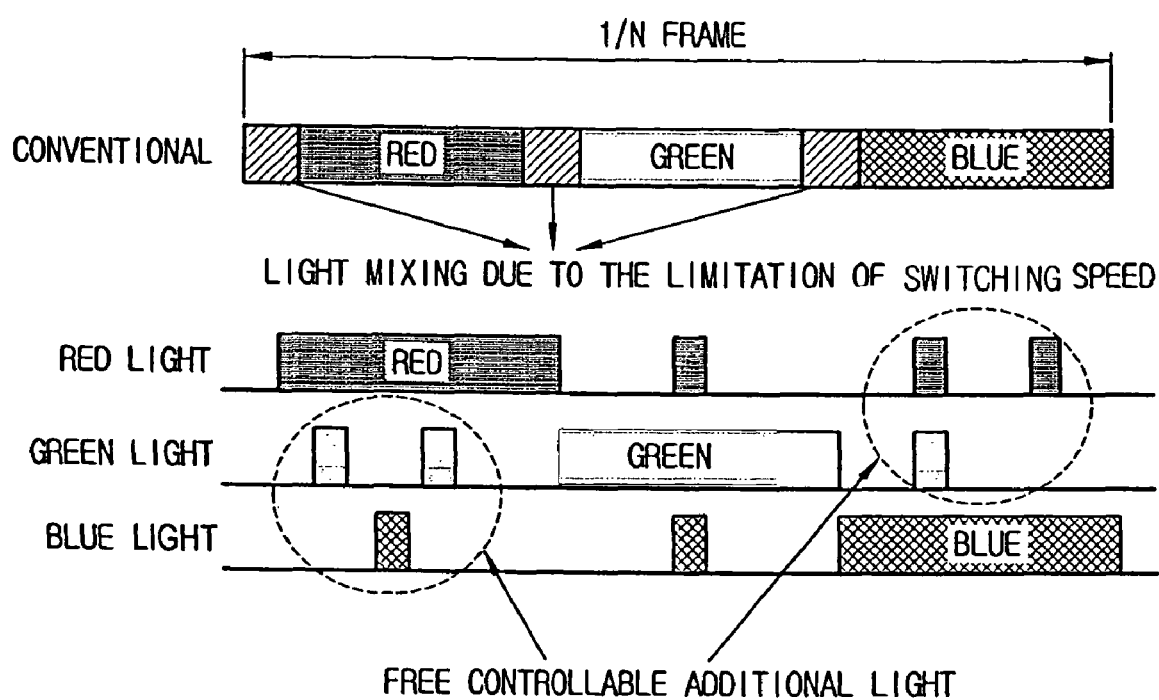
FIG. 8 illustrates an operation of the display device of FIG. 7 according to an embodiment of the present general inventive concept.

FIG. 7 illustrates a display device that uses a laser or an LED (light emitting diode) as a controllable light source, instead of using a lamp. The display device of FIG. 7 controls the laser using a switching signal. As illustrated in FIG. 8, the display device can obtain the same effects described above, by mixing other primary colors during a main period of a particular primary color specified by a broadcast standard or a color signal standard. For example, the laser device may operate a blue laser and a red laser for a predetermined amount of time during a green color period to transform the primary color green to a corresponding target primary color.

While the various embodiments of the present general inventive concept describe a three channel display device, it should be understood that the present general inventive concept may be used with a MPD (multiprimary display) that utilizes four or more primary colors. The method of processing color signals of the various embodiments of the present general inventive concept may be applied to a display device using a micro display panel element, as well as a DMD. Furthermore, the method of processing color signals can be implemented in a hardware device, or can be programmed and executed in a computer using computer readable media containing executable code therein.

In light of the foregoing, the color gamut of the input video that is reproduced can be adaptively adjusted according to the input video. A display device can reproduce the input video by adaptively transforming the color gamut thereof according to the color distribution of the input video. Therefore, a quantity of light of the reproduced video can be increased and the contrast can be enhanced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A color display apparatus comprising,
first, second, and third primary color light sources to respectively generate original primary color lights; and
a switching unit to control an operation state of each of the first, second, and third primary color light sources to emit the respective original primary color lights,
wherein each of the first, second, and third primary color light sources is alternately switched to an operation state by the switching unit to emit a respective original primary color light for a same fixed time period, and while one of the first, second, and third primary color light sources is switched to the operation state by the switching unit to emit the respective original primary color light for the same fixed time period, at least one of the other first, second, and third primary color light sources is switched to the operation state by the switching unit to emit at least another respective original primary color light for only a part of the same fixed time period so that at least two of the original primary color lights are mixed to produce one target primary color of a plurality of target primary colors.

2. The color display apparatus of claim 1, wherein the apparatus produces an output video based on the plurality of target primary colors, the output video having a higher brightness than an output video based on original primary colors from the original primary color lights.

3. The color display apparatus of claim 1, wherein the apparatus produces an output video based on the plurality of target primary colors, the output video having a higher contrast than an output video based on original primary colors from the original primary color lights.

4. The color display apparatus of claim 1, wherein at least one of the first, second, and third primary color light sources is a light emitting diode (LED).

5. The color display apparatus of claim 1, wherein at least one of the first, second, and third primary color light sources is a laser.

6. The color display apparatus of claim 1, further comprising
a target primary color calculator to calculate a target color gamut including color signal values of each pixel of an input video and to calculate target primary colors corresponding to the calculated target color gamut;
a primary color reconstructor to produce the calculated target primary colors by controlling the switching unit; and
a video data converter to convert the color signal values of each pixel of the input video so that the color signal values match the calculated target color gamut defined by the calculated target primary colors.

7. The color display apparatus of claim 6, further comprising: a color coordinates converter that corrects non-linear color signals to standard linear color signals when the input video includes non-linear color signals.

8. A method of displaying an output video, the method comprising:
respectively generating original primary color lights with first, second, and third primary color light sources; and
controlling an operation state of each of the first, second, and third primary color light sources to emit the respective original primary color lights with a switching unit,
wherein the controlling includes alternately switching each of the first, second, and third primary color light sources to an operation state by the switching unit to emit a respective original primary color light for a same fixed time period, and while one of the first, second, and third primary color light sources is switched to the operation state by the switching unit to emit the respective original primary color light for the same fixed time period, switching at least one of the other first, second, and third color light sources to the operation state by the switching unit to emit at least another respective original primary color light for only a part of the same fixed time period so that at least two of the original primary color lights are mixed to produce one target primary color of a plurality of target primary colors.

9. The method of claim 8, further comprising:
producing the output video based on the plurality of target primary colors, where the output video has a higher brightness than an output video based on original primary colors from the original primary color lights.

10. The method of claim 8, further comprising:
producing the output video based on the plurality of target primary colors, the output video having a higher contrast than an output video based on original primary colors from the original primary color lights.

11. The method of claim 8, further comprising:
calculating a target color gamut including color signal values of each pixel of an input video and calculating target primary colors corresponding to the calculated target color gamut with a target primary color calculator;
producing the calculated target primary colors with a primary color reconstructor by controlling the switching unit; and
converting the color signal values of each pixel of the input video so that the color signal values match the calculated target color gamut defined by the calculated target primary colors with a video data converter.

12. The method of claim 11, further comprising:
correcting non-linear color signals to standard linear color signals with a color coordinates converter when the input video includes non-linear color signals.

* * * * *